March 1, 1960  R. A. FINDLAY  2,927,139
RECOVERY OF HYDROGEN HALIDE FROM ISOMERIZATION CATALYST
Filed April 22, 1957
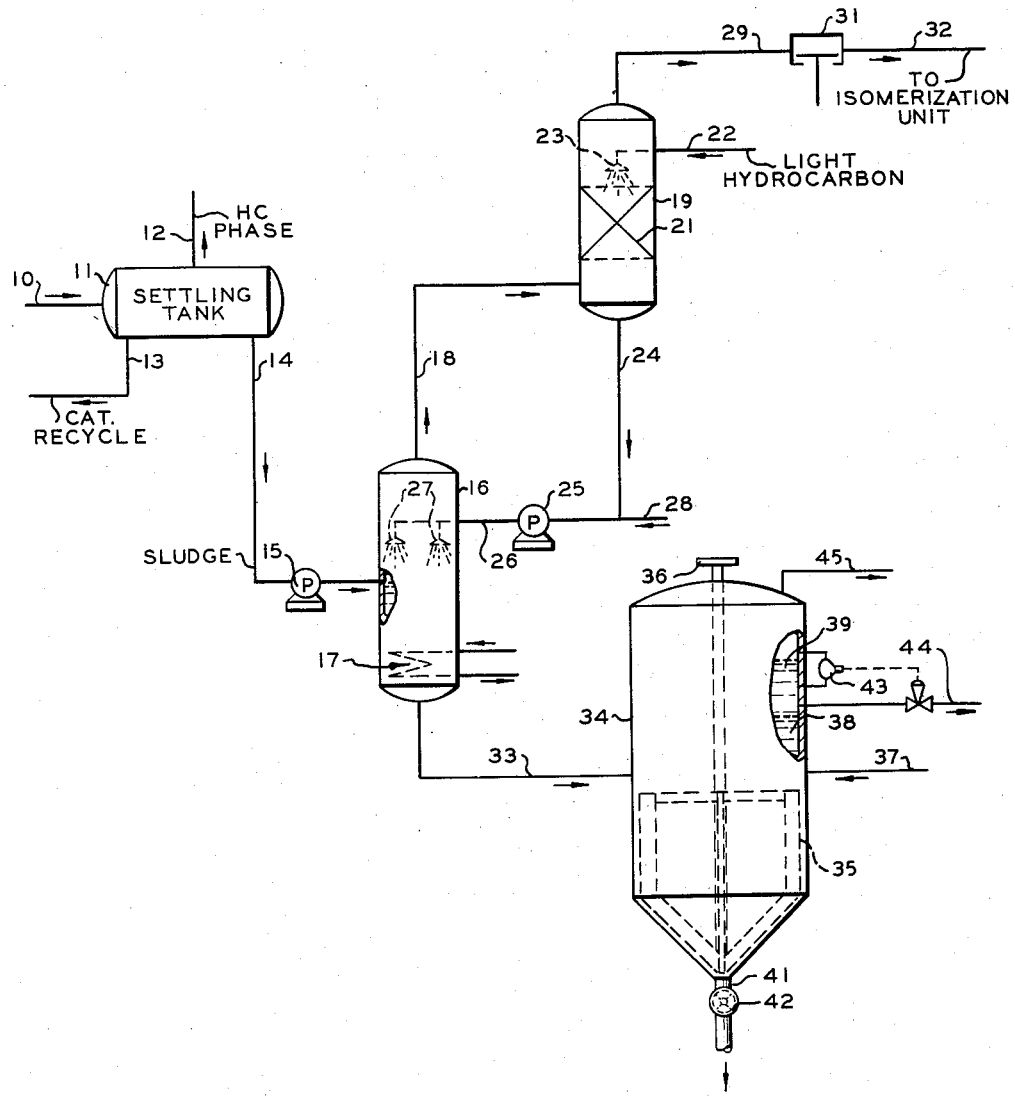
INVENTOR.
R.A. FINDLAY
BY Hudson & Young
ATTORNEYS

2,927,139
RECOVERY OF HYDROGEN HALIDE FROM ISOMERIZATION CATALYST

Robert A. Findlay, Bartlesville, Okla., assignor to Phillips Petroleum Company, a corporation of Delaware Application April 22, 1957, Serial No. 654,336

6 Claims. (Cl. 260—666)

This invention relates to an improvement in the catalytic isomerization of hydrocarbons. In one aspect it relates to a means for the recovery of hydrogen halide from the used aluminum halide-hydrocarbon complex discarded from the process.

The isomerization of hydrocarbons in the presence of aluminum halide an hydrogen halide is known. The isomerization of hydrocarbons of greater molecular weight than butane is commonly accomplished in the presence of a hydrogen halide such as hydrogen chloride, and an aluminum halide-hydrocarbon complex, such as aluminum chloride. A preferred isomerization process is described and claimed in U.S. Patent 2,661,384, issued December 1, 1953, to Harold J. Hepp. In the process of the patent a portion of the spent complex withdrawn via conduit 9 can be fortified with aluminum chloride and returned to the reactor as catalyst. The remainder of the complex can be processed for recovery of aluminum chloride or can be discarded. It has been found that hydrogen chloride is very soluble in this fluid complex so that complex withdrawn from the process contains from 6 to 8 percent of hydrogen chloride which represents a serious loss of an expensive chemical. Processes have been proposed for the recovery of hydrogen chloride and aluminum chloride from the excess or spent fluid complex catalyst resulting from the isomerization process; however, the difficulties attendant such processes have resulted in the common practice of discarding the spent catalyst instead of attempting to recover the useful chemicals present. The complex is subject to excessive foaming and coke formation when heated thus presenting difficulties in the recovery of hydrogen chloride.

It is an object of this invention to provide means for the recovery of hydrogen halide from an aluminum halide-hydrocarbon complex catalyst. It is also an object to provide a method for controlling foaming of an isomerization catalyst when it is boiled to recover hydrogen halide. It is still another object to provide an improved isomerization process wherein the hydrogen chloride is recovered from the spent catalyst discarded from the process. Other objects and advantages of this invention will be apparent to one skilled in the art by reading the accompanying disclosure and description.

I have discovered that the introduction of a relatively small amount of light hydrocarbon to the boiling complex, or sludge, will substantially eliminate foaming. The hydrocarbon should have a boiling point not appreciably higher than the temperature of the boiling complex so that the hydrocarbon is vaporized and removed with the hydrogen halide. Subsequent cooling will then condense and separate the hydrocarbon from the hydrogen halide. The complex can be caused to boil by reducing the pressure or by increasing the temperature or by a combination of the two. Hexanes, heptanes, and octanes are particularly desirable hydrocarbons for this purpose. It is usually preferred to use the feed to the isomerization process because some isomerization will occur in the hydrogen halide recovery step and additional product is thus obtained. The complex is utilized in the isomerization process under conditions of elevated temperature and pressure and substantially all of the hydrogen halide can be recovered by reducing the pressure to atmospheric. Additional heat can be supplied, if desired, to raise the temperature of the complex, although the temperature should not be raised to more than about 200° F. in order to avoid coke formation and corrosion. The amount of liquid hydrocarbon required to suppress foaming will usually be from 5 to 8 volume percent of the complex; however, more or less can be used as required.

The pressure exerted upon the complex can be released with a layer of the liquid hydrocarbon covering the complex, for example, the pressure in the phase separator or settling tank 11 of the drawing can be released with the layer of liquid hydrocarbon covering the catalyst complex. Two such settling tanks connected to the isomerization process would permit continuous operation. A preferred method, however, is to pass the complex to a flash vessel and to provide a spray of light hydrocarbon directed upon the surface of the complex. Additional heat can be provided if desired.

The following example will illustrate the process of the invention but is not to be construed as limiting the invention.

Example

A portion of aluminum chloride-hydrocarbon complex was withdrawn from an isomerization process similar to that described in U.S. Patent 2,661,384, wherein methylcyclopentane was isomerized to cyclohexane, at a pressure of 65 p.s.i.g. and the pressure was reduced to atmospheric at the rate necessary to prevent excessive foaming. A total of 89 minutes were required to reduce the pressure to atmospheric. A second portion of the complex was withdrawn from the process and the surface of the complex was covered with 6 volume percent of methylcyclopentane during the release of pressure and a total of 4.5 minutes were required to reduce the pressure to atmospheric. A third portion was agitated with a turbine mixer at 2190 r.p.m. and the time required to reduce the pressure to atmospheric was 10 minutes. To a fourth portion was added a trace of commercial antifoam agent (Dow Corning Antifoam A, designated as a silicone compound) and the time required to reduce the pressure to atmospheric was 58 minutes. In all of the above runs the foam height was held between 50 and 100 percent of the sludge bed thickness. The complex was a black, tarry, viscous fluid containing about 55 weight percent aluminum chloride, as determined by the heat of hydrolysis, and about 8 weight percent hydrogen chloride. The complex is produced in the process.

The attached drawing comprises a schematic flow-diagram illustrating one means for practicing the process of the invention.

In order to describe the invention in more detail, reference will now be made to the drawing wherein the catalyst from an aluminum chloride-hydrocarbon complex catalyzed isomerization process is passed via conduit 10 to a phase separator or settling tank 11. Liquid hydrocarbons are removed as a supernatant liquid via conduit 12. The amount of catalyst required for the process is passed via conduit 13 to a fortification zone (not shown) and is then recycled to the isomerization process (not shown). The isomerization process can be any known process wherein an aluminum halide-hydrocarbon complex is used as catalyst, e.g., the process of U.S. Patent 2,661,384.

Excess complex, over that required in the isomerization process, is passed via conduit 14 and pump 15 to flash vessel 16 containing heating means 17 in the lower portion and light hydrocarbon spray heads 27 in the upper portion. If the pressure is reduced from superatmospheric pressure in the isomerization process to atmospheric pressure in vessel 16 the pump 15 can be replaced by an expansion valve. Hydrogen chloride and some vaporized hydrocarbons are removed from vessel 16 via conduit 18 and are passed to the bottom of mist extractor 19 which contains a packing material 21 such as fine, wire-mesh packing material. Cold, liquid hydrocarbon, such as the feed to the isomerization process is introduced to the top of the packing material via conduit 22 and spray head 23. Hydrogen chloride is removed from mist extractor 19 via conduit 29, is compressed in compressor 31 and is passed to the isomerization process via conduit 32.

Liquid hydrocarbon is removed from the bottom of mist extractor 19 via conduit 24 and is passed via pump 25 and conduit 26 to spray heads 27 in the upper portion of flash vessel 16. Additional liquid hydrocarbon can be added via conduit 28.

The hydrogen chloride-free complex is withdrawn from flash vessel 16 via conduit 33 and is passed to hydrolysis vessel 34 containing scraper 35 which is slowly rotated by a power source (not shown) acting upon pulley 36. Water is passed into vessel 34 via conduit 37 to effect hydrolysis of the catalyst complex. Hydrolysis of the complex results in formation of an aqueous phase 38 comprising an aqueous slurry of coke-like carbonaceous material and aluminum oxide and/or aluminum hydroxide, and a hydrocarbon phase 39 comprising oils released by decomposition of the complex. The aqueous slurry is removed via conduit 41 and star valve 42 at a rate sufficient to maintain the aqueous phase 38 at a substantially constant level. Liquid level controller 43 maintains a substantially constant level of hydrocarbon oils in phase 39 and oil is withdrawn via conduit 44 and passed to a purification and recovery zone (not shown). Hydrogen chloride evolved as a result of decomposition of the catalyst complex passes upwardly through the oil layer of phase 39 and is removed via conduit 45. The hydrogen chloride gas is saturated with water vapor and is dried by conventional means before being returned to the isomerization process. A preferred method for removing water from the hydrogen chloride is to pass the hydrogen chloride through a bed of the catalyst complex, as described in U.S. Patent 2,436,900, issued March 2, 1948.

Hydrolysis of the complex is exothermic and the heat which is released must be removed. This can be accomplished with external or internal cooling coils, by introducing sufficient water via conduit 37 to provide internal cooling, or by other known methods.

The hydrocarbon layer which is maintained on top of the aqueous phase prevents foaming and also prevents entrainment of water with the hydrogen chloride being removed. The liquid hydrocarbon which results from decomposition of the complex is a highly aromatic oil and has utility as a source of aromatic hydrocarbons for organic synthesis reactions. The portion of the oil boiling in the gasoline range is an excellent source of high octane gasoline components.

Alternatively the hydrolysis of the complex can be accomplished according to the process described in application Serial No. 546,127, filed November 10, 1955, now U.S. Patent No. 2,852,582, issued September 16, 1958, by P. S. Stallings and J. W. Clark. In the process of Patent No. 2,852,582 complete hydrolysis is accomplished in the lower portion of a reaction vessel. A portion of the complex feed is sprayed into the upper portion of the vessel and is partially hydrolyzed by the vapors evolved by the hydrolysis reaction in the lower part of the vessel. Substantially anhydrous hydrogen halide is recovered from the top of the vessel.

Instead of hydrolyzing the hydrogen halide-depleted complex it can be discarded.

Reasonable variations and modifications are possible within the scope of the disclosure of the present invention, the essence of which is the discovery that foaming of aluminum halide-hydrocarbon complex during boiling of the complex can be controlled by introducing a liquid hydrocarbon to the surface of the boiling complex.

That which is claimed is:

1. In the process of isomerizing hydrocarbons having 4 to 10 carbon atoms per molecule in the presence of hydrogen halide and an aluminum halide-hydrocarbon complex wherein excess catalyst complex is withdrawn from the process, the improvement comprising boiling said excess complex to remove dissolved hydrogen halide; introducing to the surface of the boiling complex a liquid hydrocarbon having a boiling point below the temperature of the boiling complex and in an amount sufficient to suppress foaming of the complex; recovering vaporous hydrogen halide as a product of the process; withdrawing hydrogen halide-depleted complex from said boiling step; hydrolyzing said withdrawn complex; recovering a water-saturated vapor of hydrogen halide from said hydrolyzing step as an additional product of the process; and recovering hydrocarbon oils resulting from hydrolysis of said complex as an additional product of the process.

2. A process for recovering dissolved hydrogen halide from an aluminum halide-hydrocarbon complex which comprises boiling said complex at a temperature not higher than about 200° F.; introducing to the surface of the boiling complex a liquid hydrocarbon having a boiling point not higher than the temperature of the boiling complex to suppress foaming; and recovering hydrogen halide freed from said complex as a vapor.

3. The process of recovering hydrogen chloride contained in aluminum chloride-hydrocarbon complex which has been utilized as catalyst in an isomerization process wherein hydrocarbons having 4 to 10 carbon atoms per molecule are isomerized at a temperature in the range of about 125 to 325° F. and pressure sufficient to maintain said hydrocarbons in the liquid phase, comprising passing said complex to a boiling zone; boiling the complex at a temperature not higher than about 200° F. so as to remove hydrogen chloride as a vapor; spraying onto the surface of the boiling complex a liquid hydrocarbon having a boiling point lower than that of the boiling complex; recovering a vaporous mixture of hydrocarbon and hydrogen chloride; condensing and removing liquid hydrocarbon; recovering hydrogen chloride as a product of the process; passing hydrogen chloride-depleted complex from said boiling zone to a hydrolysis zone; introducing water to said hydrolysis zone to hydrolyze said complex; recovering hydrogen chloride from said hydrolysis zone as a vapor as additional product of the process; removing an aqueous slurry of solid decomposition products from said hydrolysis; and recovering hydrocarbon oils resulting from said hydrolysis as an additional product of the process.

4. The process of recovering hydrogen chloride contained in aluminum chloride-hydrocarbon complex which has been utilized as catalyst in an isomerization process wherein methylcyclopentane is isomerized to cyclohexane which comprises passing said complex to a boiling zone; boiling the complex at a temperature not higher than about 200° F. and substantially atmospheric pressure so as to remove hydrogen chloride as a vapor; spraying methylcyclopentane onto the surface of the boiling complex in an amount of 5 to 8 volume percent of the complex; recovering a vaporous mixture of methylcyclopentane and hydrogen chloride; condensing and removing methylcyclopentane as a liquid; and recovering hydrogen chloride as a product of the process.

5. The process of recovering hydrogen chloride contained in aluminum chloride-hydrocarbon complex which has been utilized as catalyst in an isomerization process wherein methylcyclopentane is isomerized to cyclohexane which comprises passing said complex to a boiling zone;

boiling the complex at a temperature not higher than about 200° F. and substantially atmospheric pressure so as to remove hydrogen chloride as a vapor; spraying liquid methylcyclopentane onto the surface of the boiling complex in an amount of 5 to 8 volume percent of said complex; recovering a vaporous mixture of methylcyclopentane and hydrogen chloride; condensing and removing methylcyclopentane as a liquid; recovering hydrogen chloride as a product of the process; passing hydrogen chloride-depleted complex from said boiling zone to a hydrolysis zone; introducing water to said hydrolysis zone to hydrolyze said complex; recovering hydrogen chloride from said hydrolysis zone as a vapor as an additional product of the process; removing an aqueous slurry of solid decomposition products from said hydrolysis; and recovering hydrocarbon oils resulting from said hydrolysis as an additional product of the process.

6. In the process of isomerizing hydrocarbons having 4 to 10 carbon atoms per molecule in the presence of hydrogen halide and an aluminum halide-hydrocarbon complex at elevated temperature and pressure wherein excess catalyst complex is withdrawn from the process, the improvement comprising passing said complex to a zone of atmospheric pressure at a temperature not greater than about 200° F. so as to vaporize and remove hydrogen halide from said complex; introducing to the surface of said complex a liquid hydrocarbon having a boiling point below the temperature of the complex in said zone of atmospheric pressure and in an amount sufficient to suppress foaming of the complex; recovering vaporous hydrogen halide as a product of the process; withdrawing hydrogen halide-depleted complex from said zone of atmospheric pressure; passing said complex to a hydrolyzing zone containing water therein; hydrolyzing said complex in said hydrolyzing zone; recovering hydrogen halide as a water saturated vapor from said hydrolyzing zone as an additional product of the process; and recovering hydrocarbon oils resulting from hydrolysis of said complex as an additional product of the process.

References Cited in the file of this patent

UNITED STATES PATENTS

| | | |
|---|---|---|
| 2,415,973 | Swearingen | Feb. 18, 1947 |
| 2,661,384 | Hepp | Dec. 1, 1953 |
| 2,669,539 | Ditman | Feb. 16, 1954 |
| 2,744,856 | Wendell | May 8, 1956 |
| 2,855,448 | Goord | Oct. 7, 1958 |